US009696434B2

United States Patent
Burr et al.

(10) Patent No.: US 9,696,434 B2
(45) Date of Patent: Jul. 4, 2017

(54) SCINTILLATOR ARRAY TEST METHOD, APPARATUS, AND SYSTEM

(71) Applicant: TOSHIBA MEDICAL SYSTEMS CORPORATION, Otawara-shi (JP)

(72) Inventors: Kent C. Burr, Buffalo Grove, IL (US); Zhengyan Wang, Antioch, IL (US); Madhuri Kaul, Buffalo Grove, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 213 days.

(21) Appl. No.: 14/731,223

(22) Filed: Jun. 4, 2015

(65) Prior Publication Data

US 2016/0356895 A1    Dec. 8, 2016

(51) Int. Cl.
G01T 1/20 (2006.01)
G01T 1/202 (2006.01)
G01T 7/00 (2006.01)

(52) U.S. Cl.
CPC .............. *G01T 1/2006* (2013.01); *G01T 1/20* (2013.01); *G01T 1/202* (2013.01); *G01T 7/00* (2013.01)

(58) Field of Classification Search
CPC ......... G01T 1/20; G01T 1/202; G01T 1/1644; G01T 1/2006
USPC ........................................................ 250/362
See application file for complete search history.

(56) References Cited

U.S. PATENT DOCUMENTS

| 5,281,394 A * | 1/1994 | Holub .................... G01N 35/04 250/328 |
| 7,884,316 B1 | 2/2011 | Menge et al. |
| 2012/0187081 A1 | 7/2012 | Philip et al. |

FOREIGN PATENT DOCUMENTS

CN    102353976 B    7/2013

OTHER PUBLICATIONS

Huini Du, et al., "An Algorithm for Automatic Flood Histogram Segmentation for a PET Detector" IEEE Nuclear Science Symposium and Medical Imaging Conference Record (NSS/MIC), 2012, pp. 3488-3492.
"Scintillator Array Test Method, Apparatus, and System Knock-Out Search Report" Thomson Reuters, Jul. 30, 2015, 28 Pages.
(Continued)

*Primary Examiner* — David Porta
*Assistant Examiner* — Meenakshi Sahu
(74) *Attorney, Agent, or Firm* — Oblon, McClelland, Maier & Neustadt, L.L.P.

(57) ABSTRACT

An apparatus and method for testing scintillator arrays, e.g., crystal arrays for PET imaging. The apparatus includes, a two-sided tray arranged to hold scintillator arrays in either side and slide the arrays into a light-tight box having a radiation source beneath the arrays and photomultiplier tubes (PMTs) above the arrays. When arranged in the testing position with the arrays interposed between the radiation source and the PMTs, ambient light from outside the box is prevented from leaking into the box and high-voltage power is supplied to the PMTs. Otherwise, to prevent PMT damage, the high-voltage is off. The radiation source is an arrangement of sealed low-activity pieces of radioactive elements, thus minimizing requirements for radiation shielding and minimizing safety risks. The method calculates a flood map from scintillation data/counts and performs analysis according to predefined criteria, e.g., the peak-to-valley ratio, to flag arrays exhibiting inferior quality.

19 Claims, 13 Drawing Sheets

(56) References Cited

OTHER PUBLICATIONS

M. Platino, et al., "Fabrication and testing system for plastic scintillator muon counters used in cosmic showers detection" 32nd International Cosmic Ray Conference, vol. 4, 2011, pp. 330-333.

\* cited by examiner

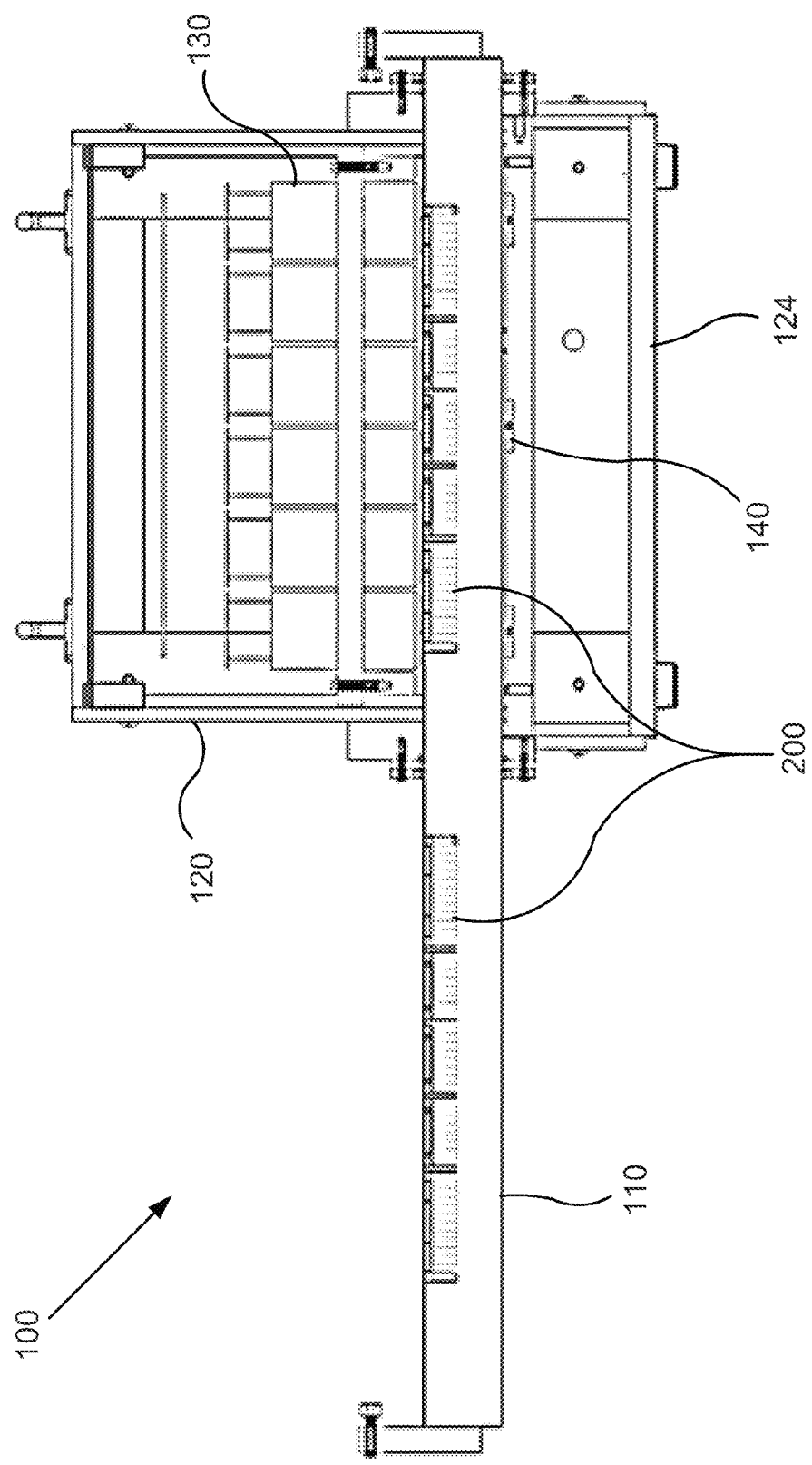

SCINTILLATOR ARRAY TEST METHOD, APPARATUS, AND SYSTEM

BACKGROUND

Field

Embodiments described herein relate generally to a testing apparatus and method to test scintillator arrays, and more particularly a testing apparatus for scintillator arrays that uses a PMT array to detect scintillation photons and that can be operated in a lighted room, without manual turning off a high voltage to the PMT array.

Description of the Related Art

In typical positron emission tomography (PET) imaging, a radiopharmaceutical agent is introduced into an object to be imaged via injection, inhalation, or ingestion. After administration of the radiopharmaceutical, the physical and bio-molecular properties of the agent cause it to concentrate at specific locations in the human body. The actual spatial distribution of the agent, the intensity of the region of accumulation of the agent, and the kinetics of the process from administration to its eventual elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are combined. Most of the time, an annihilation event produces two gamma rays (at 511 keV) traveling at substantially 180 degrees apart.

In order to be able to reconstruct the spatio-temporal distribution of the radio-isotope via tomographic reconstruction principles, each detected event will need to be characterized for its energy (i.e., amount of light generated), its location, and its timing. By detecting the two gamma rays, and drawing a line between their locations, i.e., the line-of-response (LOR), one can determine the likely location of the original disintegration. While this process will only identify a line of possible interaction, by accumulating a large number of those lines, and through a tomographic reconstruction process, the original distribution can be estimated. In addition to the location of the two scintillation events, if accurate timing (within a few hundred picoseconds) is available, a time-of-flight (TOF) calculation can add more information regarding the likely position of the event along the line. Limitations in the timing resolution of the scanner will determine the accuracy of the positioning along this line. The collection of a large number of events creates the necessary information for an image of an object to be estimated through tomographic reconstruction.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. Most modern PET scanners are composed of several thousand individual crystals (i.e., scintillator elements), which are arranged in two-dimensional scintillator arrays that are packaged in modules with photodetectors to measure the light pulses from respective scintillation events. The relative pulse energy measured by the photodetectors is used to identify the position of the scintillation event. Typically scintillator elements have a cross section of roughly 4 mm×4 mm. Smaller or larger dimensions and non-square sections are also possible. The length or depth of the crystal will determine how likely the gamma ray will be captured, and typically ranges from 10 to 30 mm. One example of a scintillation crystal is LYSO (or $Lu_{1.8}Y_{0.2}SiO_5$: Ce or Lutetium Orthosilicate), which is chosen for its high light output, fast rise time, fast decay time, high average atomic number, and high density. Other crystals can be used.

Using Anger logic and crystal decoding, the source of each scintillation event can be identified as originating from a particular scintillator. A scintillation event will generate light initially radiating isotopically. The spatial distribution of this light may be modified by interactions with scintillator surfaces and reflectors before being detected by the four nearest photodetectors. From the relative pulse energy measured by each of these four photodetectors, the position of the scintillation event relative to the four photodetectors can be determined. The formulas for deriving position information from the relative pulse energies of the photodetectors are referred to as Anger arithmetic, named for Hal Anger.

Coordinates for the x-position and the y-position of a scintillation event are calculated using Anger arithmetic, wherein the x- and y-positions are determined by taking the ratios between the responses of neighboring sensors. Estimating positions from linear combinations of sensor signals leads to distortions, such as pincushion-like distortions. For crystal arrays, the determination of which scintillator element a scintillation event originated from is generally accomplished by comparing the x- and y-positions derived through Anger arithmetic to a lookup table generated from a flood map. This process of mapping from the x- and y-positions obtained using Anger arithmetic to discrete scintillator elements is referred to as crystal decoding.

BRIEF DESCRIPTION OF THE DRAWINGS

A more complete understanding of this disclosure is provided by reference to the following detailed description when considered in connection with the accompanying drawings, wherein:

FIG. 3B shows a sectioned side view of an implementation of the ATA;

FIG. 4E shows a top view of an implementation of the ATA in which the switch is visible, wherein the switch signals that the high voltage (HV) to the PMT can be safely turned on;

DETAILED DESCRIPTION

Figure 1A:
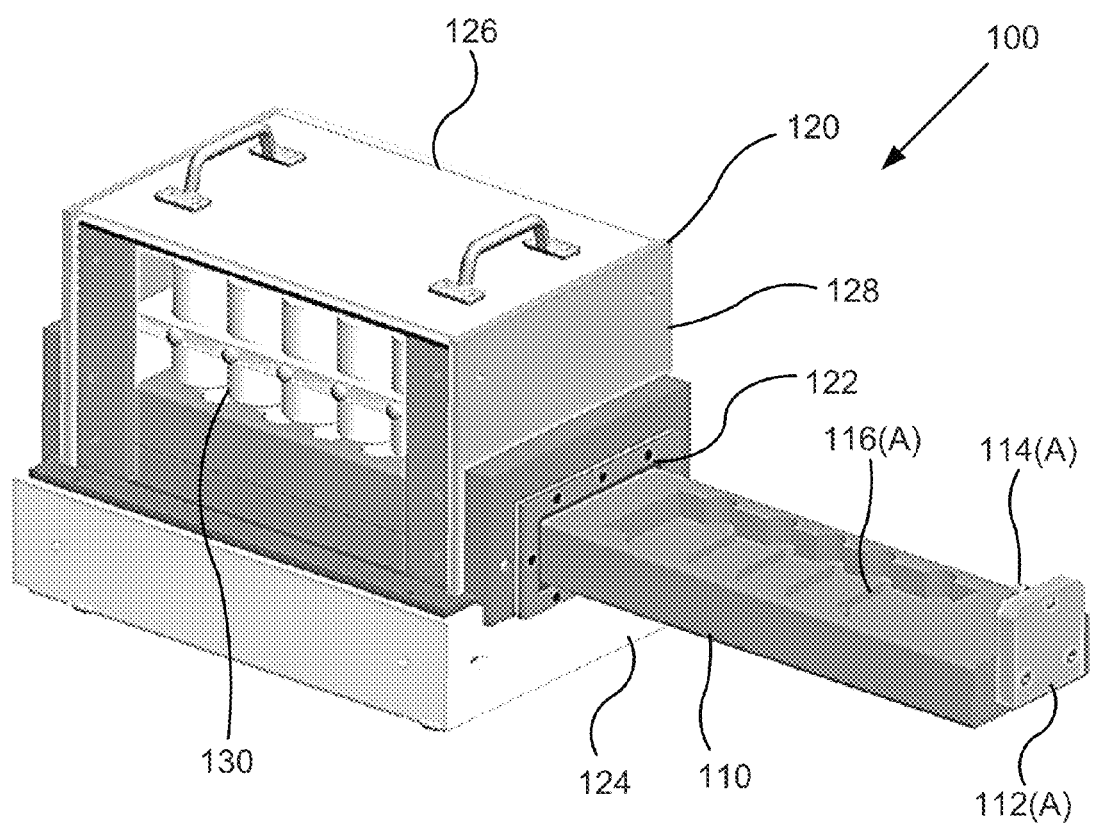
FIG. 1A shows an oblique view of an implementation of an array test apparatus (ATA) in which a side wall is transparent in order to show a photomultiplier tube (PMT) array interior to the ATA.

In one embodiment, the present disclosure provides a testing apparatus, comprising: (i) a light-tight housing configured with a through hole extending from a first side of the light-tight housing to a second side of the light-tight housing; (ii) a tray configured to hold test objects; (iii) a radiation source arranged inside the light-tight-housing below the through hole, and (iv) an optical detector array arranged inside the light-tight housing above the through hole, wherein (1) the tray is arranged in the through hole of the light-tight housing, extending past a plane of the first side of the light-tight housing, and extending past a plane of the second side of the light-tight housing, (2) the tray is slidably connected to the light-tight housing, and (3) the tray and the light-tight housing are configured to minimize light leaking into the light-tight housing, when the tray is in a first testing position.

Pixelated arrays of small discrete crystals are routinely used as a detector material in medical imaging systems, such as positron-emission tomography (PET) systems. For example, in PET, the scintillator elements in a scintillator array can be made from the scintillation crystal LYSO (or $Lu_{1.8}Y_{0.2}SiO_5$:Ce or Lutetium Orthosilicate). The pixel size and arrangement can vary depending on the manufacturer's requirements. For example, scintillator crystal elements can be as small as 1-4 $mm^2$ in cross-sectional area and up to 10 mm in length for pre-clinical organ specific scanners, and as large as 16-36 $mm^2$ in cross-sectional area and 10-30 mm in length for whole body scanners. The pixels can have varying degrees of surfaces roughness on different surfaces and they can be arranged with or a reflective material between them to reduce and/or control the optical cross-talk between scintillator elements. The scintillator arrays convert gamma rays to optical signals, and the optical signals are coupled to photodetectors (e.g., photomultiplier tubes (PMTs)) via a lightguide or some other optical coupling medium to allow for light sharing among the photodetectors. This light sharing is used for the Anger arithmetic and crystal decoding processes.

The arrays can vary in performance and/or have specific assembly-related defects. If poor performance or defects are not detected before final assembly of the detector module, then repair or replacement of the defective part is costly and time consuming. Therefore, testing the arrays prior to assembly of the detector modules is important. Further, it is also important that the method of testing scintillator arrays be safe and rapid. The array testing should be safe by ensuring that the person performing the test is not exposed to large amounts of radiation, and also safe in that risks of damage to testing equipment (e.g., the PMTs) are mitigated.

In fully assembled PET detector modules, lightguides might be used between the scintillator array and the photodetectors. To ensure transmission of the scintillation light from the crystals to the PMTs, the arrays are bonded to the lightguide or to the PMTs using optically transparent glue or RTV. In a conventional testing of scintillator arrays to verify that the array meets performance requirements and is free from defects, silicon-based optical grease or other liquid-like coupling agents can be used. These liquid-like coupling agents are used in place of cured elastomers or RTV that are used in the fully assembled PET detector module. Once applied, this grease is difficult to remove. If the grease is not fully removed, the contaminated surface of the array can form an improper bond with the elastomer or RTV during the final assembly. Thus, detectors built with contaminated arrays have an increased likelihood of optical decoupling between the arrays and the lightguide.

Additionally, conventional bench-top testing of arrays is done using light-tight boxes. Each time the box is opened to change the setup (e.g., to remove and/or insert scintillator arrays) the PMTs are exposed to ambient light. If the user does not turn off the high voltage to the PMTs before opening the box, the PMTs can be damaged permanently. Currently there is no apparatus to test multiple crystal arrays in a closed system efficiently, and without risk of contamination from optical grease or another liquid-like optical coupling agent.

The above-identified problems with conventional table-top array testing systems can be remedied by using the array test apparatus (ATA) described herein. The ATA is configured to safely test a large quantity of crystal arrays without exposing the PMTs to ambient light. This is achieved by housing the PMTs inside a closed structure that is configured to substantially prevent light from entering the box when the structure is arranged in a testing configuration. Thus, this structure is a light-tight box that, under typical indoor lighting conditions, limits light transmission into the box to levels that will not damage energized PMTs.

Further, the ATA does not use liquid-like optical coupling agents (e.g., optical grease or uncured RTV) that might contaminate surfaces and later prevent adequate adhesion or curing of the permanent coupling agent during the final detector assembly. Rather, the ATA uses air as the coupling agent between the scintillator arrays and the PMTs. To compensate for the reflection losses resulting from using air instead of a liquid coupling agent, a radiation source with a greater gamma-ray energy than used in clinical applications is used for testing. For example, cesium isotope 137 (Cs-137), which produces gamma rays with an energy of 662 keV, is used in the ATA, in contrast to the clinical radiation sources, which produce gamma rays with an energy of 511 keV.

Moreover, the ATA will enable simultaneous testing of one batch of scintillator arrays while loading another batch of scintillator arrays. The ATA uses a tray that slides into two testing positions corresponding to the left and right halves of the tray. The tray slides back and forth in the light-tight box. When one batch of scintillator arrays is being tested, the other side of the tray 110 is outside the light-tight box 120, and is accessible to a user. Thus, in one-half of the tray 110, scintillator arrays can be removed and inserted into the tray 110, while the other half is being tested inside the light-tight box 120. Further, the tray 110 and the light-tight box 120 are configured to minimize ambient light leaking into the box when the tray is in either of the testing positions. When the tray is not in either of the testing positions, the high voltage (HV) to the PMTs is turned off. This eliminates the need to manually turn off the HV to the PMTs.

Thus, the ATA disclosed herein remedies the above-identified problems with conventional table-top array testing systems.

Figure 1B:
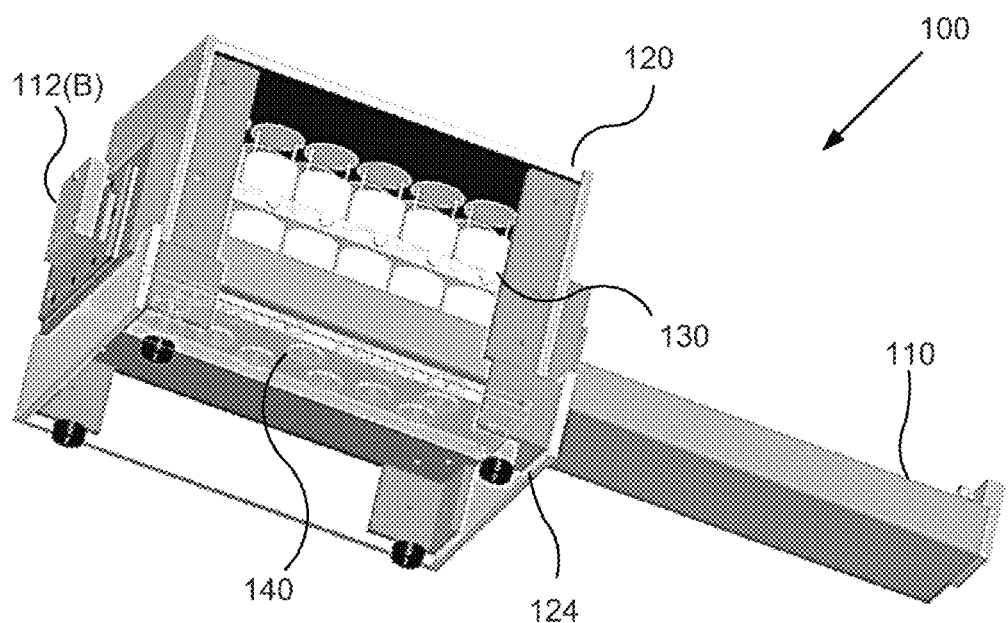
FIG. 1B shows an oblique view of an implementation of the ATA in which a side wall and a bottom wall are transparent in order to show a radiation source interior to the ATA.
Figure 1C:
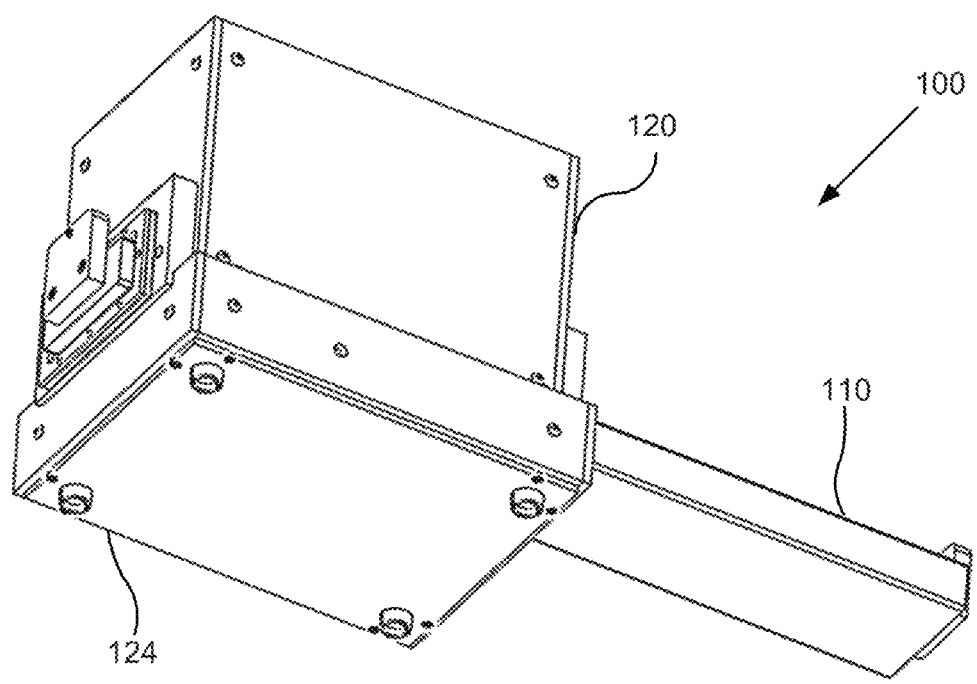
FIG. 1C shows an oblique view of an implementation of the ATA in which none of the walls are transparent.

Referring now to the drawings, wherein like reference numerals designate identical or corresponding parts throughout the several views, FIGS. 1A, 1B, 1C, 2, 3A, 3B, 4A, 4B, 4C, 4D, and 4E show different views of the array testing apparatus 100. FIGS. 1A and 1B show oblique views of the ATA 100 in which the side and bottom of the light-tight box 120 are transparent in order to see the interior structure inside the light-tight box. FIG. 1C shows an oblique view of the ATA 100 (similar to FIG. 1B) with the side and bottom of light-tight box 120 being opaque.

The light-tight box 120 includes an upper portion 128, a bottom portion 124, a lid portion 126, and a light seal 122 configured around a through hole passing all of the way from one side of the light-tight box 120 to the other side of the light-tight box 120. The tray 110 is configured to slide back and forth in the through hole. The tray 110 includes a right side (A) and a left side (B). For example, on the right side (A) a series of recesses 116(A) are provided to accommodate a batch of scintillator arrays 200 (shown in FIG. 2). In general, the scintillator arrays 200 includes more than one scintillator array, and the arrays within the scintillator arrays 200 can have different numbers of scintillator elements and different numbers of rows and columns of elements. A stopper plate 112(A) and an adjustable offset 114(A) are also provided on the right side (A) of the tray 100. The adjustable offset 114(A) provides adjustable control of the first testing position. This adjustability enables proper alignment for the scintillator arrays 200 with the PMT array 130.

Proper alignment is important for two reasons. First, proper alignment makes the flood histograms more symmetric and uniform. Second, proper alignment helps to ensure that the high voltage (HV) to the PMT array 130 switch does not turn on until the tray 110 is in a position that prevents light leaks. While the tray is being moved, the light seal 122 might be imperfectly positioned to prevent light from leaking into the light-tight box 120.

The tray 100 is in the first testing position when the tray 100 is slid all the way to one side, such that the adjustable offset 114(A) contacts the exterior of the light seal 122. When the tray 100 is in the first testing position, a switch 150 (shown in FIG. 4E) senses an indentation 118(A) in the tray 110 (shown in FIG. 2). When the switch 150 (shown in FIG. 4E) senses the indentation 118(A), a signal from the switch indicates that the tray is in position for testing, and the HV is turned on, activating the PMT array 130. When the switch 150 (shown in FIG. 4E) does not sense the indentation 118(A), the HV is turned off, and the PMT array 130 is inoperable. Thus, damage to the PMT array 130 is prevented by turning off the HV to the PMT array 130 when the tray 110 is in between testing positions, which potentially allows higher levels of ambient light into the light-tight box 120.

Similar to the right side (A) of the tray 100, the left side (B) of the tray 110 also includes a series of recesses 116(B) to accommodate a batch of scintillator arrays 200, a stopper plate 112(B), an adjustable offset 114(B), and an indentation 118(B) to indicate that the tray is in the second testing position when the adjustable offset 114(B) contacts the light-tight box 120. In the second testing position, the switch 150 senses the indention 118(A), indicating it is safe to turn on the HV to the PMT array 130.

Thus, the ATA 100 is configured to safely and rapidly test a large number of crystal arrays without exposing the PMT array 130 to ambient light. This is achieved by housing the PMT array 130 inside the light-tight box 120 and turning the HV off when the tray 110 is not in one of the two testing positions. When the tray 110 is in one of the two testing positions, the combination of the light-tight box 120 and the tray 110 minimizes the amount of ambient light leaking into the PMT array 130, such that the leakage of light is maintained below the damage threshold of the PMTs. Thus, this structure is a light-tight box that, under typical indoor lighting conditions, prevents data to the PMT array 130.

Further, the ATA 100 does not use liquid-like optical coupling agents (e.g., optical grease or uncured RTV) that might contaminate surfaces and later prevent adequate adhesion or curing of the permanent coupling agent during the final detector assembly. Rather, the ATA 100 uses air as the coupling agent between the scintillator arrays being tested and the PMT array 130. To compensate for the attenuation resulting from using air instead of a liquid coupling agent, a radiation source with a higher gamma-ray energy is used for testing as compared to clinical applications. For example, the radiation source 140 can use a number of pieces of Cs-137, which produce gamma rays with energies of 662 keV. These pieces of Cs-137 can be arranged to create an approximately uniform flux density of gamma rays at the plane of the tray 110. The gamma rays with energies of 662 keV produced by the Cs-137 are higher than the 511 keV gamma rays produced by clinical radiation sources. Instead of multiple pieces, a substantially uniform distributed source could be used (commonly known as a "flood source"). The use of multiple point-like sources is often preferable because they are available as standard products from multiple vendors.

The radiation source 140 uses multiple low-activity radiation sources with long half-lives and relatively high gamma-ray energies (e.g., Cs-137 which has a half-life of approximately 30 years). Other potential choices for sealed radioactive elements in the radiation source 140 include: germanium isotope 68 (Ge-68 with a half-life of 0.74 years and gamma-ray energy of 511 keV), sodium isotope 22 (Na-22 with a half-life of 2.6 years and gamma-ray energies of 511 keV and 1.275 MeV), and cobalt isotope 60 (Co-60 with a half-life of 5.3 years and gamma-ray energies of 1.17 MeV and 1.33 MeV). The higher gamma-ray energies of the radiation source 140 result in more optical photons being generated during scintillation, and this higher optical photon flux partially compensates for the lower optical coupling efficiency resulting from air-coupling. For example, in PET, the clinical gamma-ray energy is 511 keV, but the radiation source 140 using Cs-137 produces gamma rays of energy 662 keV, so that total light collection in the ATA 100 is at approximately the same level achieved in the final detector assembly when a permanent coupling agent is used.

With multiple pieces of Cs-137 precisely arranged, good uniformity of gamma ray flux can be achieved even when the radiation source 140 are arranged close to the scintillator arrays 200. When the radiation source 140 is arranged close to the plane of the scintillator arrays 200, low activity sources can be used while simultaneously achieving a flux density that allows testing to be performed in a reasonable amount of time (e.g., 10's of seconds to a few minutes).

Also, with low-activity sources, the radiation shielding requirements are minimized, thus reducing costs and risks to the users.

The recesses 116(A) and 116(B) in the tray 110 maintain the scintillator arrays 200 in a predefined spatial relation to the PMT array 130, and ensure that repeatable testing can be performed and that the scintillator arrays 200 are held in the proper position to achieve good crystal decoding. In one implementation, the tray 110 is made of a non-scintillating material that interacts minimally with gamma rays.

The ATA 100 is configured to accommodate scintillator arrays 110 with a variety of thicknesses (e.g., 10 mm to 30 mm), while also ensuring that the distance between the scintillator output surface and the PMT array 130 is a predefined distance. For example, the tray 110 can be modified with different adapters or shims in the recesses 116(A) and 116(B) to accommodate different sizes of scintillator arrays 110.

When the tray 110 is not in one of the two testing positions and the switch 150 is not in one of the indentations 118(A) and 118(B), then the switch 150 shuts off the HV power to the PMT array 130 in order to prevent damage due to light leakage during the movement of the tray 110.

Figure 2:
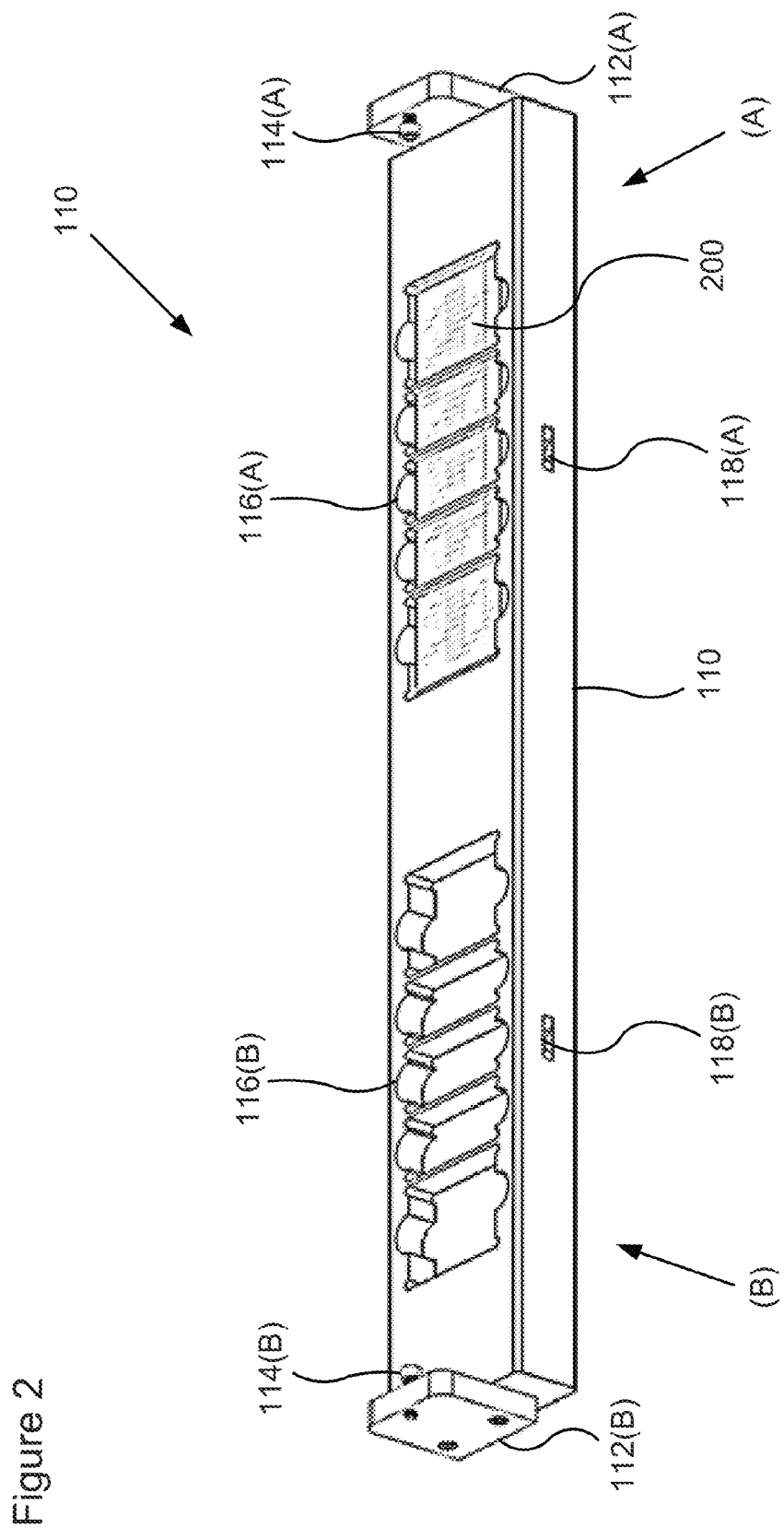
FIG. 2 shows an oblique view of an implementation of a tray holding scintillator arrays for testing in the ATA.

FIG. 2 shows an oblique view of the tray 110 in which a batch of scintillator arrays 200 is loaded into the recess 116(A) of the tray 110 and no scintillator arrays 200 are loaded into the recess 116(B) of the tray 110.

Figure 3A:
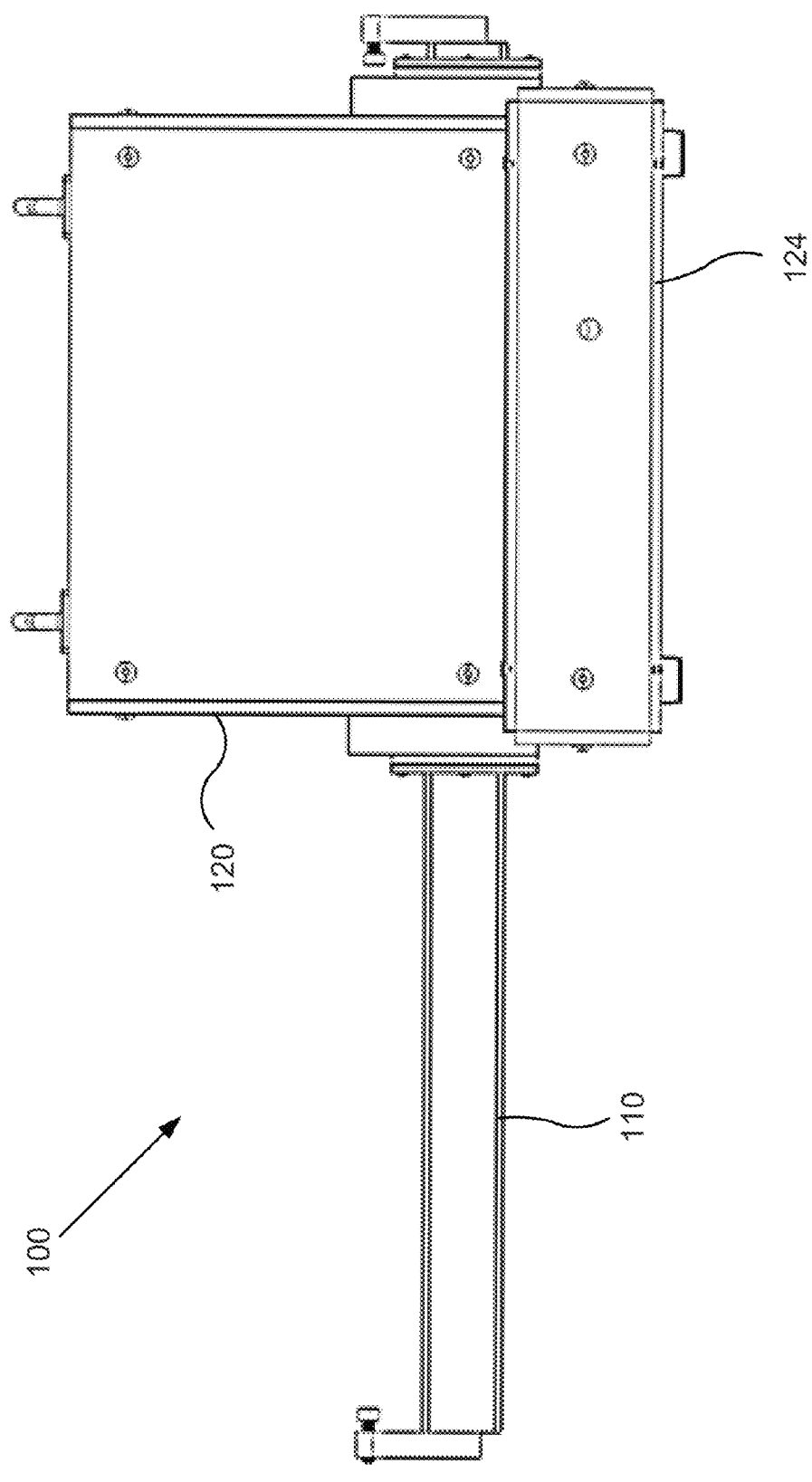
FIG. 3A shows a side view of an implementation of the ATA.

FIG. 3A shows a side view of the ATA 100, and FIG. 3B shows a side view of the ATA 100 that is sectioned in half to reveal the inner structure of the ATA 100.

Figure 4A:
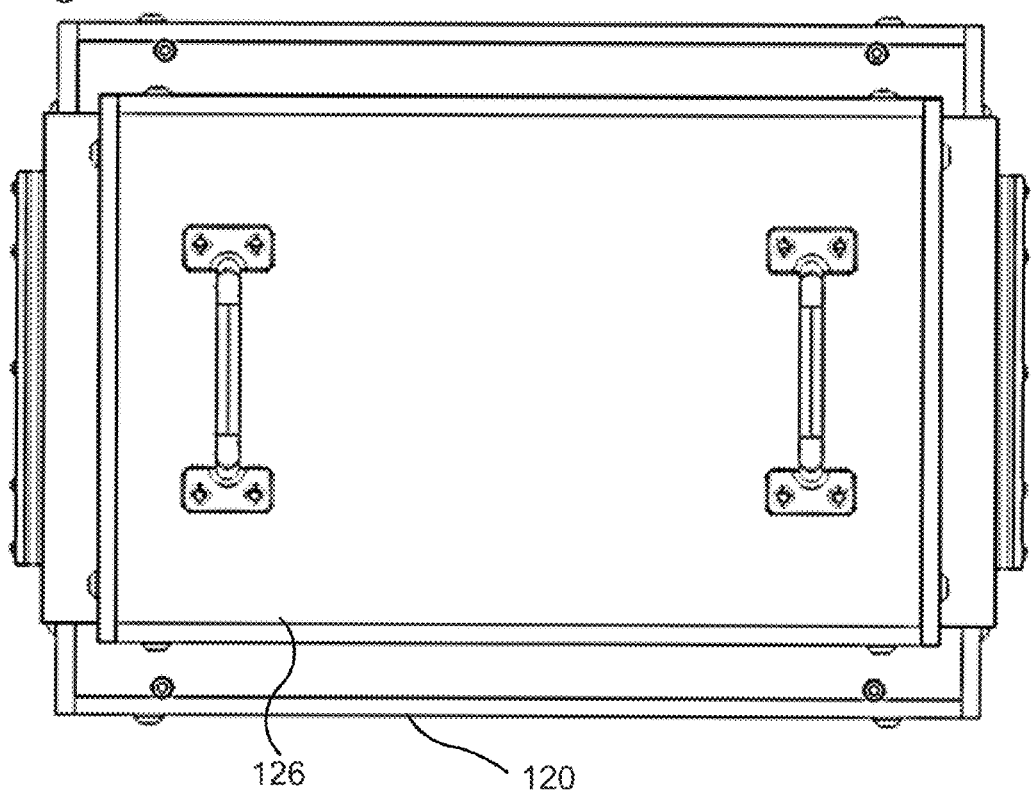
FIG. 4A shows a top view of an implementation of the ATA in which the lid is visible.
Figure 4B:
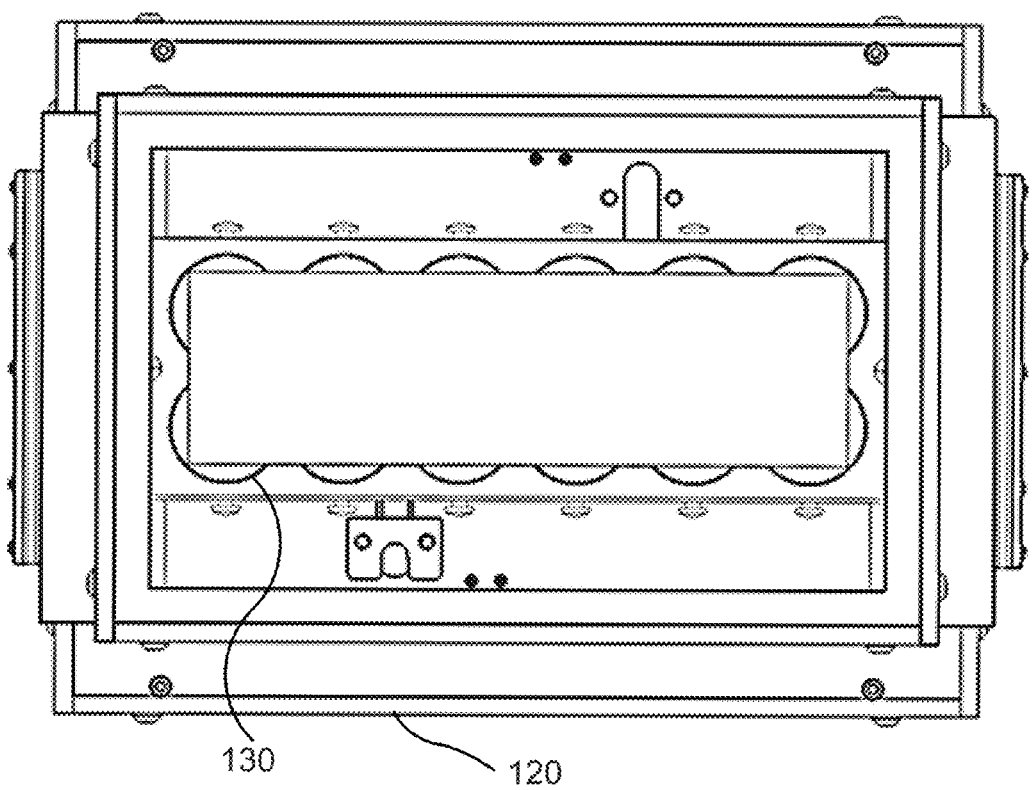
FIG. 4B shows a top view of an implementation of the ATA in which the PMT array is visible.
Figure 4C:
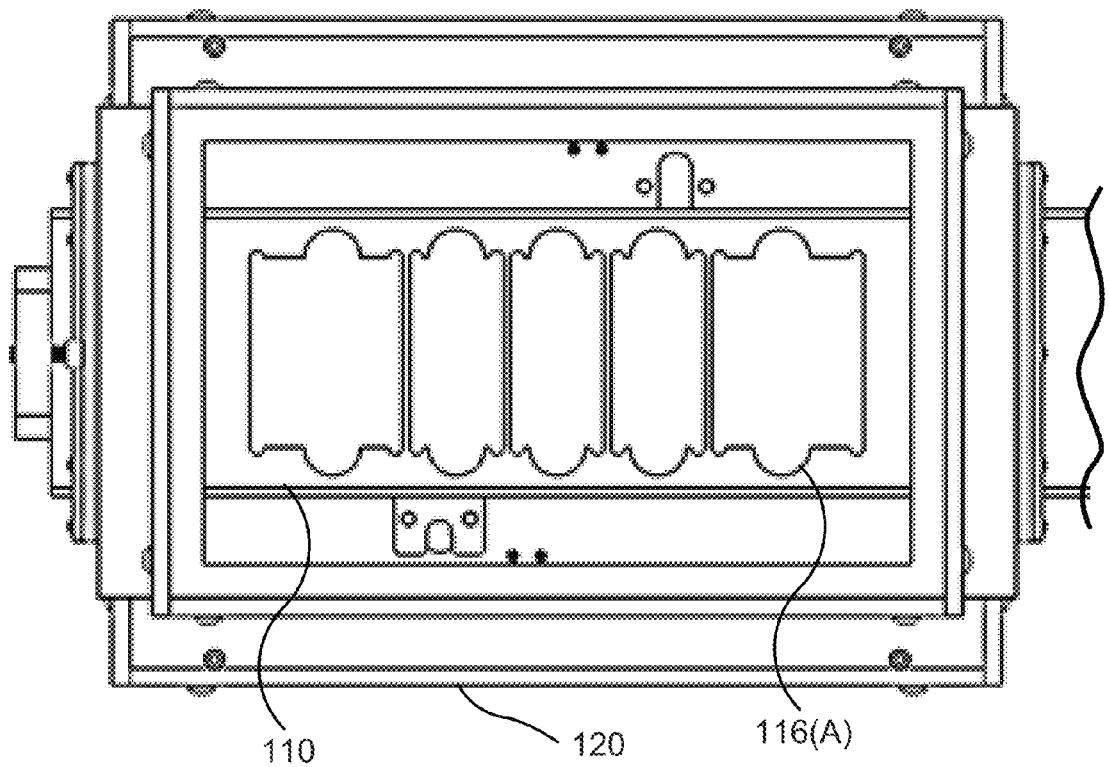
FIG. 4C shows a top view of an implementation of the ATA in which the tray for holding scintillator arrays is visible.
Figure 4D:
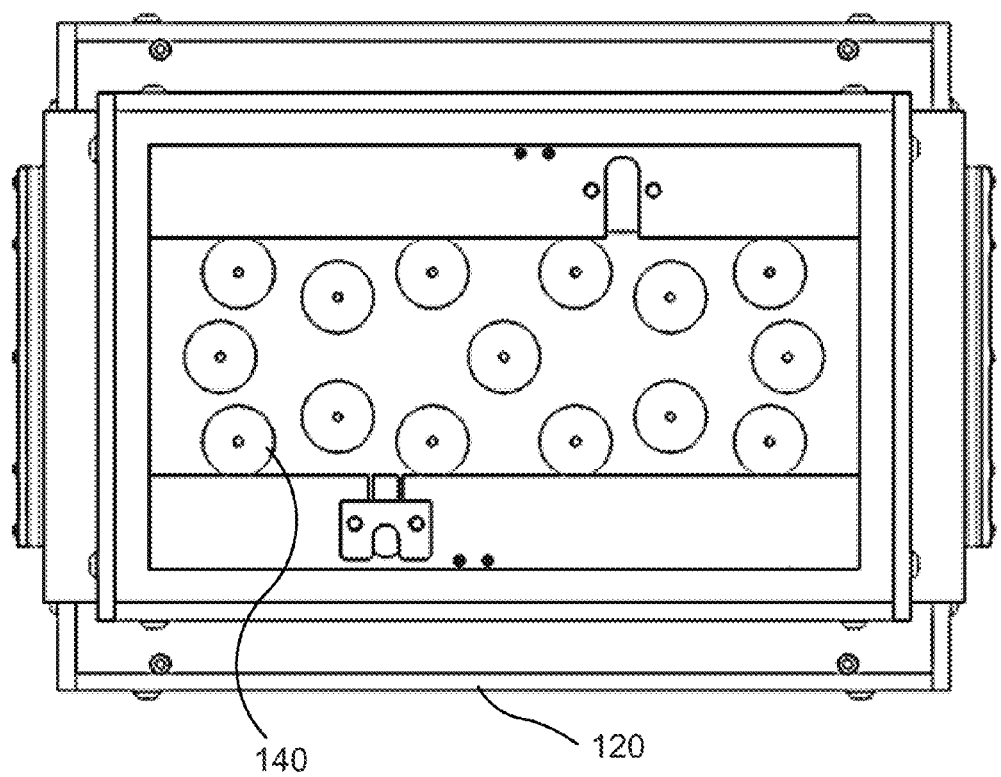
FIG. 4D shows a top view of an implementation of the ATA in which the radiation source is visible.
Figure 4E:
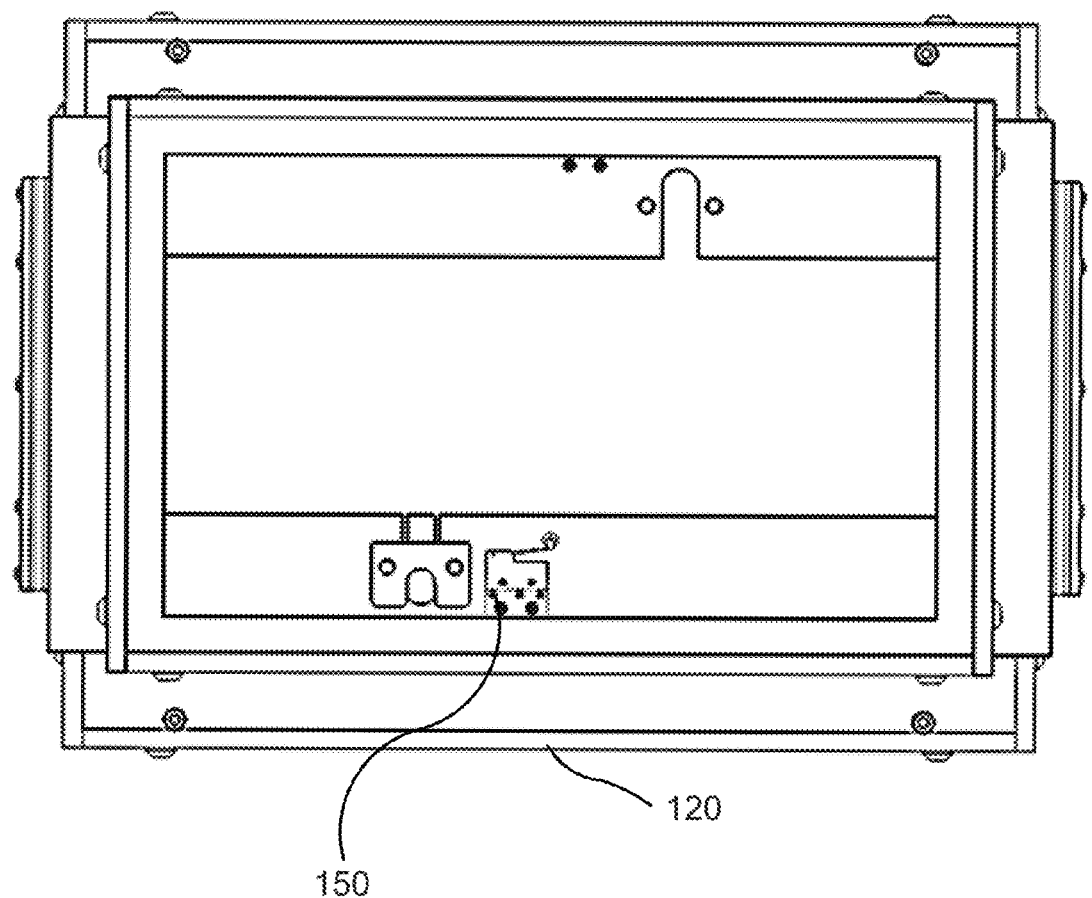

FIGS. 4A-4E show a top view of the ATA 100 with various layers removed to reveal the interior structure of the ATA 100. FIG. 4A shows the ATA 100 with the lid 126 visible. FIG. 4A shows the ATA 100 without the lid 126, such that the PMT array 130 is visible. In FIG. 4C, both the lid 126 and PMT array 130 are removed making the tray 110 and the recesses 116(A) visible. In FIG. 4D, the tray 110 is also removed making the radiation source 140 visible. Finally, FIG. 4E shows the switch 150 that is positioned along an inner wall of the light-tight-box 120 to detect the indentations 118(A) and 118(B) in the tray 110, when the tray 110 is in one of the two testing positions.

The examples described herein illustrate the case in which the tray has two testing positions. One of ordinary skill in the art will recognize that a tray having one testing position or more than two testing positions is also possible.

As exemplified in FIG. 4D, the radiation source 140 can include, e.g., 15 pieces of a radioactive element, such as Cs-137, arranged symmetrically to provide a uniform flux density of gamma rays in the plane of the scintillator arrays 200 held on the tray 110. The positions and the amount of the radioactive element of each radioactive piece can be chosen in order to satisfy predefined uniformity criteria.

In one implementation, the uniformity criteria dictate that the number of radioactive pieces is held constant, and the amount of radioactive material per radioactive piece is uniform, but the positions of the radioactive pieces can be optimized to provide a uniform flux density. In another implementation, the number of radioactive pieces is held constant, but the amount of radioactive material per radioactive piece can be adjusted in discrete intervals in addition to adjusting the positions of the radioactive pieces to optimize the uniformity of the flux density. In a third implementation, the number of radioactive pieces is held constant, but the amount of radioactive material per radioactive piece is continuously adjustable in addition to adjusting the positions of the radioactive pieces to optimize the uniformity of the flux density. In a fourth implementation, the number of radioactive pieces is allowed to vary and the minimum number of radioactive pieces is selected that satisfies the uniformity criterion. Moreover, any suitable permutation of the above-identified uniformity criteria can be combined or omitted to create another set of criteria for the uniformity of the flux density.

Figure 5A:
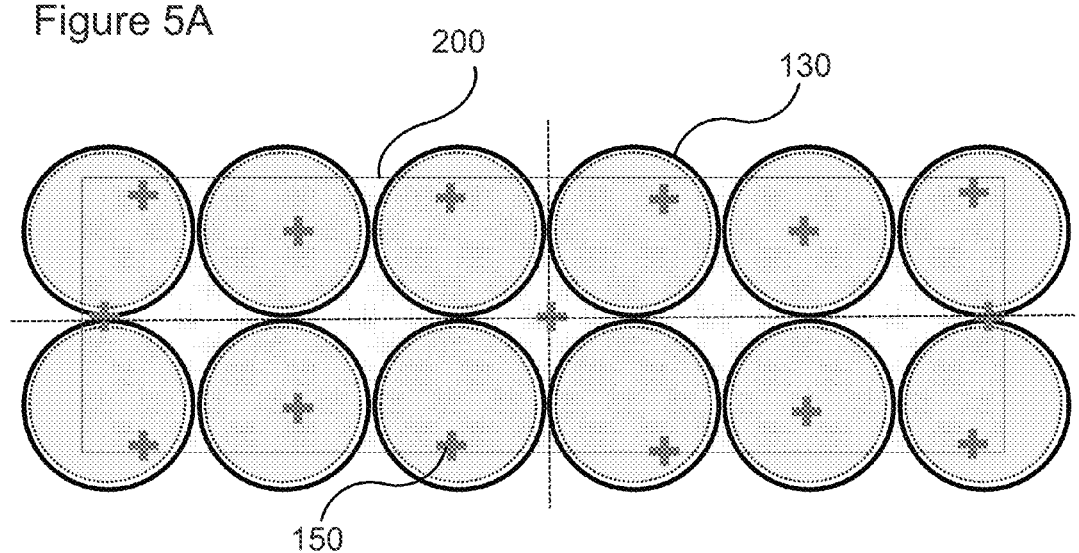
FIG. 5A shows a top view of the relative arrangement of the radioactive pieces of the radiation source, the scintillator arrays, and the PMT array, according to one implementation.
Figure 5B:
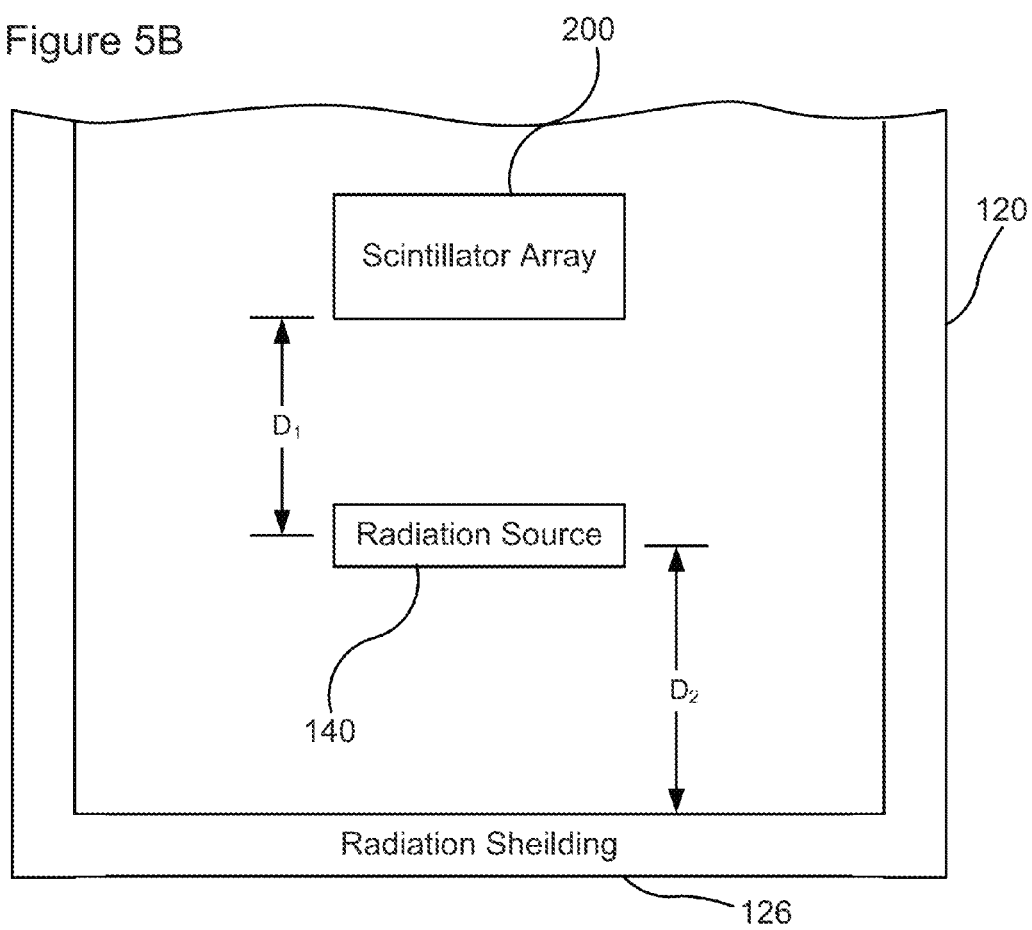
FIG. 5B shows an end view of the relative arrangement and dimensions of a light-tight box, the radiation source, and the scintillator arrays, according to one implementation.

FIGS. 5A and 5B show one implementation of the relative arrangement of the radiation source 140, the scintillator arrays 200, and the PMT array 130. In FIG. 5A the positions of the radioactive pieces are indicated by plus signs. The position of the scintillator arrays 200 is indicated by the grey rectangle. The position of the PMT array is indicated by the two-dimensional array of circles.

Figure 5C:
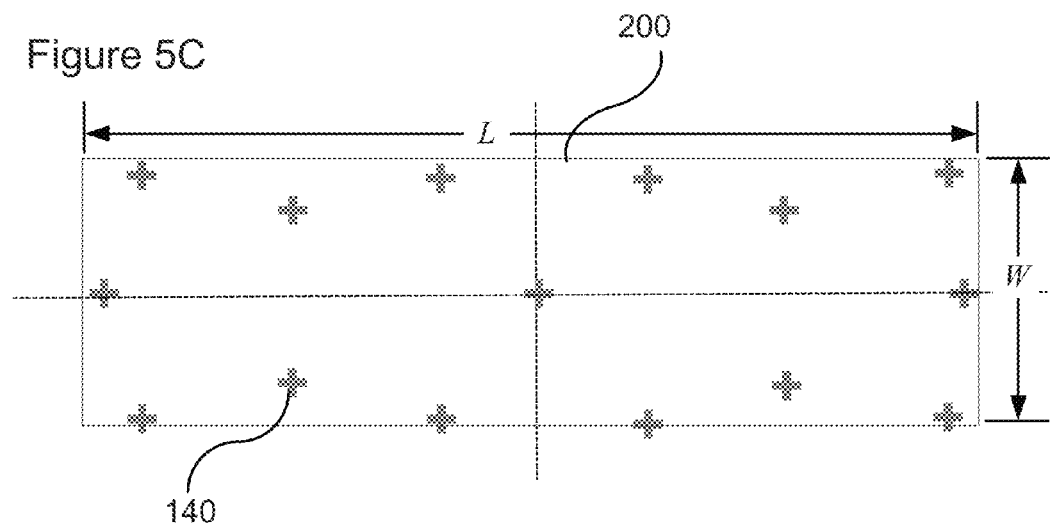
FIG. 5C shows a top view of the relative arrangement of the radioactive pieces of the radiation source and the scintillator arrays, according to one implementation.
Figure 5D:
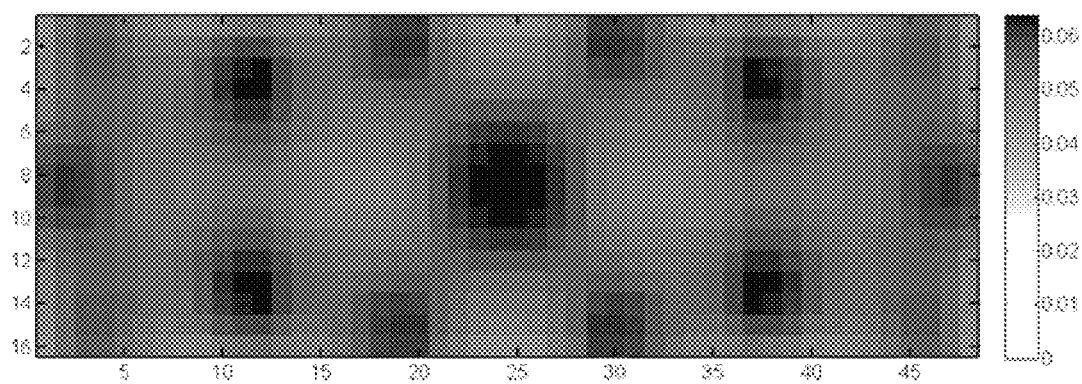
FIG. 5D shows a simulation of a flux density of gamma rays incident on a plane of the scintillator arrays, according to one implementation.

FIG. 5C shows the relative arrangement of the radiation source 140 and the scintillator arrays 200, and FIG. 5D shows simulated results for the gamma ray flux density when the distance $D_1$ between the radiation source 140 and the scintillator arrays 200 is 18 millimeters. The grey level indicates the flux density according to the color-bar on the right-hand side. For this simulation, the width W of the scintillator arrays 200 is 66 mm, and the length L is 218 mm.

One of several uniformity measures can be used in the uniformity criteria. A target flux is selected (i.e., the mean flux density $\langle\Phi\rangle_{A_{SA}}$ through the predefined scintillator array area $A_{SA}$). For example, the uniformity measure U can then be defined as the normalized p-norm of the mean-subtracted flux density over the area $A_{SA}$ as given by $$U_p = \left(\frac{\int\int_{A_{SA}} |\Phi - \langle\Phi\rangle_{A_{SA}}|^p}{A_{SA}}\right)^{1/p} \Big/ \langle\Phi\rangle_{A_{SA}}.$$

Further, the infinity-norm gives the maximum value over the area $A_{SA}$. The zero-norm gives the geometrical mean of the absolute value of the mean-subtracted flux density over the area $A_{SA}$. The size and relative locations of the radiation source 140 and the scintillator arrays 200 are given by the predefined values indicated in FIGS. 5B and 5C.

Thus, the uniformity criteria can include various permutations on requirements regarding the number of radioactive pieces, the amount of radioactive material in each radioactive piece, the choice of uniformity measure U, and a threshold/range for each of the previous factors. For example, the uniformity criteria can dictate that the radiation source 140 be optimized according to the following constraints: (i) the radiation source 140 includes no more than fifteen radioactive pieces, (ii) the radioactive pieces can be moved to any position in a plane a distance $D_2$ below the scintillator arrays 200 and within a predefined area inside the light-tight box 120, (iii) each radioactive piece can include an arbitrary amount of radioactive material so long as the aggregate of all radioactive pieces has an activity below a predefined threshold, and (iv) the uniformity measure $U_2$ is optimized.

After the configuration of the radiation source 140 has been formulated as a constrained optimization problem, any suitable conventional optimization method can be used to obtain a satisfactory configuration of the radiation sources. For example, a gradient-descent method could be used to optimize the arrangement and the amount of radioactive material of the radioactive pieces.

FIG. 5B further shows that the distance between the radiation source 140 and the wall of the bottom portion 124 of the light-tight box 120 is the predefined distance $D_2$. The formula for the dose rate D in milliroentgen per hour (mRem/hr) at a distance S in centimeters (cm) from the radiation source 140 is given by $$D = \frac{3233 \cdot A}{S^2},$$

wherein A is the activity of the radiation source in millicuries (mCi). This formula is specific to Cs-137.

For example, at a distance of 30 cm, a radiation source 140 having an aggregate activity of 0.15 mCi results in the dose rate of 0.53 mRem/hr, which is well below 2.5 (mRem/hr), corresponding to a forty hour work week and the OSHA limit of 1.25 rem/qtr. Thus, no radiation shielding would be required when working at arms-length from a of 0.15 mCi radiation source. However, the walls of the light-tight box 120 can provide radiation shielding. For example, the half-value thickness for steel surrounding a Cs-137 radiation source is 2.9 cm. Therefore, a light-tight box 120 with walls made of 6 mm thick steel, will attenuate gamma rays by 13.5% of the original dose rate. Thicker material would provide more shielding.

After initiating a test of the scintillator arrays 200 in the ATA 100 and waiting a predetermined amount of time, sufficient scintillation data is acquired such that the quality of the scintillator arrays 200 can be analyzed. One of the results of the analysis is a flood map of each array in the scintillator arrays 200 (e.g., FIG. 2 shows five arrays in the scintillator arrays 200). Additionally, the flood map is partitioned by finding and demarking the boundaries between regions corresponding to individual scintillator elements.

Figure 6:
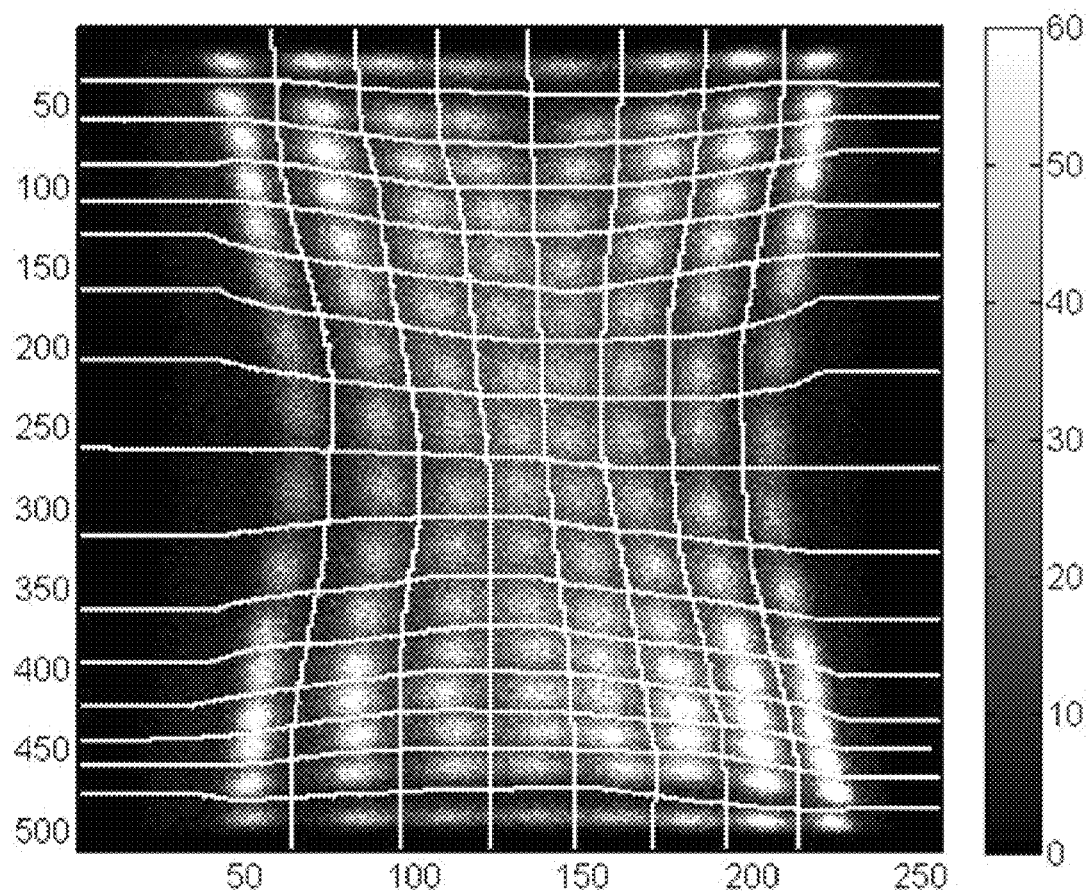
FIG. 6 shows an example of a flood map for a 16×8 scintillator array, according to one implementation.

FIG. 6 shows one implementation of a flood map for a 16×8 array of scintillator elements. The horizontal and vertical axes correspond to the x and y axes of the Anger arithmetic, and the white level indicates the density of counts according the color-bar on the right-hand side. Superimposed on the flood map in FIG. 6 are lines demarking the boundaries between regions corresponding to individual scintillator elements.

Figure 7:
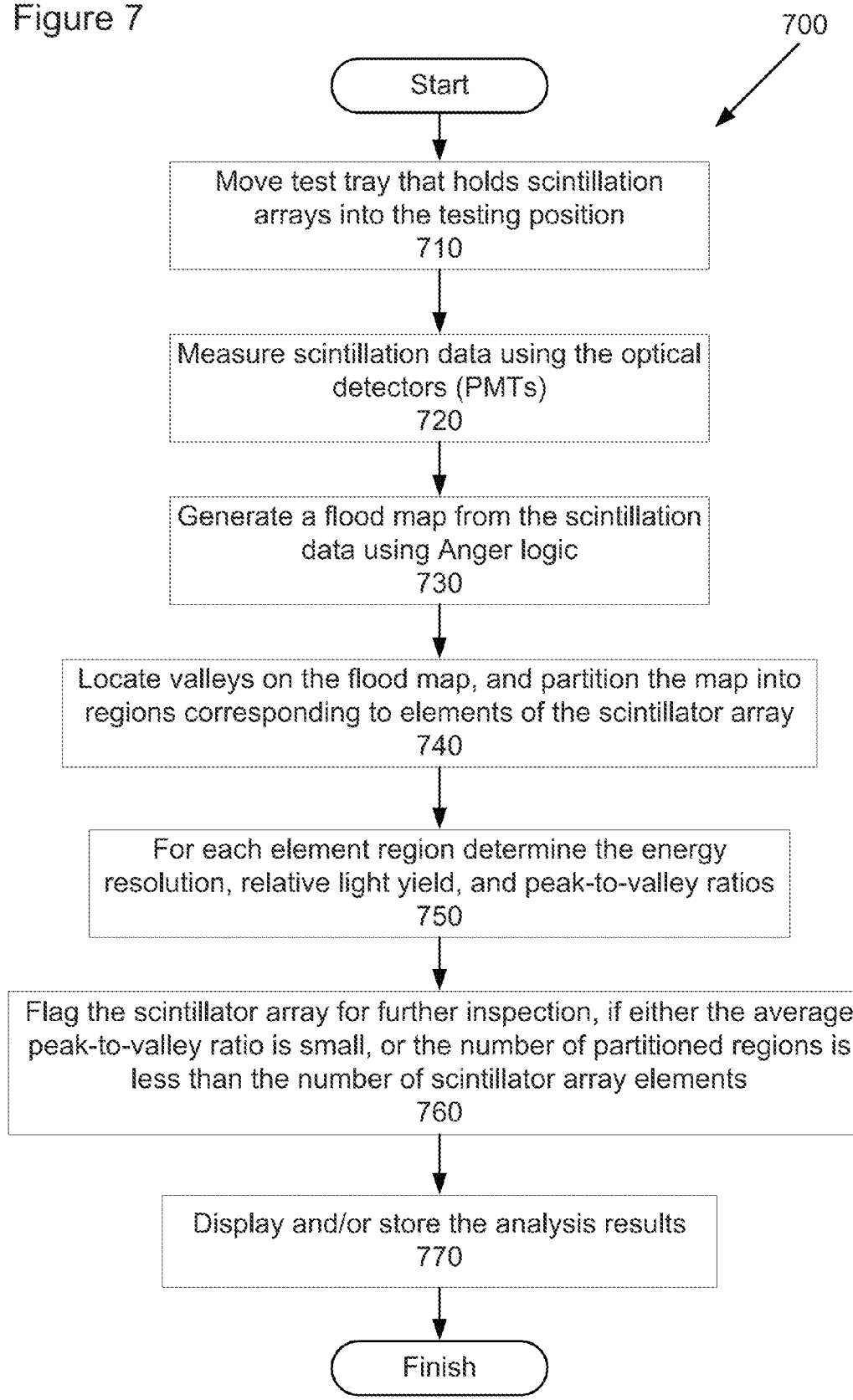
FIG. 7 shows a flow diagram of an implementation of a method of analyzing scintillation data from the ATA.

FIG. 7 shows an exemplary method for processing and analyzing the scintillation data in order to determine the array quality and the presence of defects in the scintillator array.

The array test method 700 begins at step 710 when the test objects (e.g., the scintillator arrays) are placed in a recess 116 of the tray 110, and the tray 110 is slide into a testing position relative to the light-tight box 120.

In step 720 of method 700, the PMT HV is turned on, and a predefined period of time passes before sufficient scintillation data has been acquired. The period of time can be decreased by using a radiation source 140 with a higher level of activity, but there is a trade-off with radiation shielding in order to maintain acceptable dose rates when the activity of the radiation source 140 is increased. The scintillation data can be stored on a computer-readable memory and/or preprocessed prior to the analysis of the scintillation data in steps 730 through 760.

In step 730 of method 700, a flood map (e.g., the flood map shown in FIG. 6) is generated using Anger arithmetic. This process is well known and is not described herein.

In step 740 of method 700, the flood map is partitioned into regions corresponding to individual elements of the respective arrays. For example, the scintillator arrays can be configured as two-dimensional arrays of scintillator elements, and each element generates a pulse of optical scintillation photons when impacted by a gamma ray. The cross section of each scintillator elements can be 4 mm×4 mm, for example. Further, the scintillator elements can have different surface treatments or reflective material between them to reduce and/or control the optical cross-talk between scintillator elements.

As shown by the flood map in FIG. 6, most of the scintillation counts are peaked near the centers of the scintillator elements, and taper off near the edges. Thus, the flood map shows a pattern of peaks and valleys. By locating the valleys between the peaks, boundaries can be identified between the regions of the flood map corresponding to each respective scintillator element. For example, the steps 730 and 740 can be performed using the flood histogram and segmentation method described in H. Du and K. C. Burr, "An Algorithm for Automatic Flood Histogram Segmentation for a PET Detector," *IEEE NSS/MIC Conference Record*, 3488 (2012), incorporated herein by reference in its entirety.

In step 750 of method 700, various analyses of the scintillation data and flood map are performed, including: for each scintillator element—the energy resolution, the relative light yield, and the peak-to-value ratio.

In step 760 of method 700, the results of the analysis in steps 720 through 740 are compared to predefined criteria, and if the criteria are satisfied, the scintillator array is signaled as being of good quality. The array quality can be categorized according to the quality of the material of individual elements and the quality of the assembly of individual elements into the array, for example. If the criteria are not satisfied, the scintillator array is signaled for further inspection.

In one set of criteria, the light output and energy resolution of each crystal is compared to predefined thresholds for light output and energy resolution. In another set of criteria, errors in the assembly of the scintillator elements or in the reflective material in between scintillator elements are identified using two criteria. The first criterion determines whether the ratio between the peak flood-map value within a partitioned region and the integrated flood-map value around the boundary of the partitioned region is below a predefined value. If the ratio is below a predefined value, the scintillator array is flagged for potential defects. The second criterion inquires whether the number of partitioned regions matches the specified number of elements in the scintillator array. If the number of partitioned regions is less than (or not equal to) the specified number of elements, then the scintillator array is flagged for potential defects. If a scintillator array fails either of the two criteria and is flagged for potential defects, then the array is subject to further inspection. In another implementation, any permutation of the above-identified criteria can be used to evaluate scintillator array elements and to determine whether further inspection of a given scintillator array is needed.

In step 770 of method 700, the analysis results are displayed and/or stored into a computer-readable memory.

Figure 8:
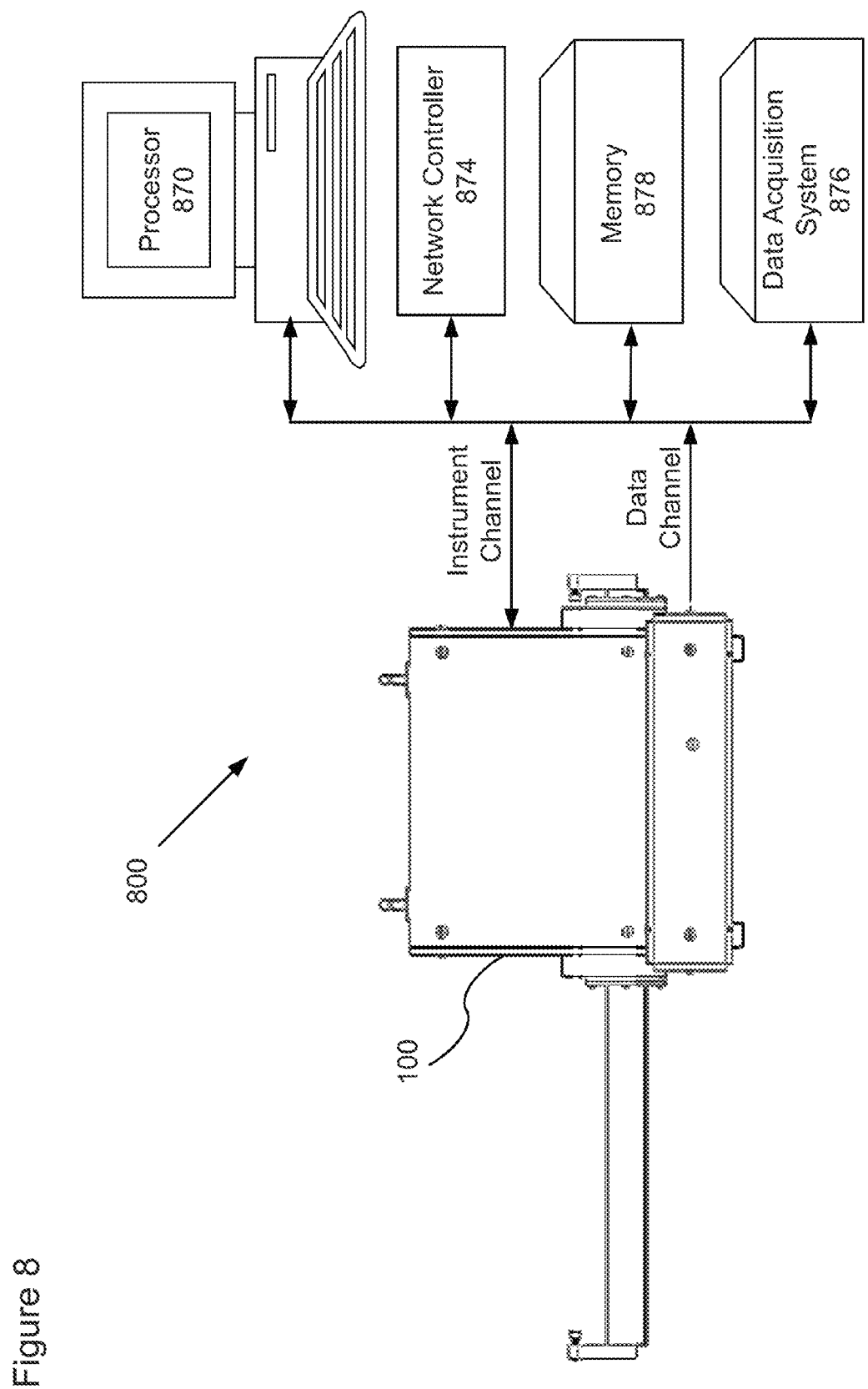
FIG. 8 shows an implementation of a scintillator-array test system including the ATA and processing circuitry to collect and process the scintillation data from the ATA.

FIG. 8 shows a scintillator-array test system 800 including the ATA 100 and circuitry and hardware for acquiring, storing, processing, and distributing scintillation data and analysis results. The circuitry and hardware include: a processor 870, a network controller 874, a memory 878, and a data acquisition system 876. The scintillation-array test system 800 also includes a data channel that routes scintillation data from the PMT array 130 to the data acquisition system 876, the processor 870, the memory 878, and the network controller 874. The data acquisition system 876 controls the acquisition, digitization, and routing of scintillation data from the detector array 130. The data acquisition system 876 also can include control circuitry to control the voltages of the photomultipliers, for example. The data acquisition system 876 can be a centralized system or, alternatively, it can be a distributed or networked system. For example, some control circuitry of the data acquisition system 876 can be located within the array test apparatus 100 and other control circuitry can be located remotely, and this distributed control circuitry of the data acquisition system 876 can communicate using network communication.

In one implementation, the data acquisition system 876 is integrated with the processor 870. The processor 870 performs various computational functions including Anger logic of the scintillation data, analysis of the scintillation data, calculating energy resolution, partitioning the flood map into element regions, statistical analysis, and comparing analysis results with anticipated/calibration values and with thresholds indicating a minimum acceptable performance.

The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU of the processor 870 executes a computer program including a set of computer-readable instructions that perform the method 700 described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the scintillation analysis results can be displayed on a display. The display can be an LCD display, CRT display, plasma display, OLED, LED, or any other display known in the art.

The memory 878 can be a hard disk drive, CD-ROM drive, DVD drive, FLASH drive, RAM, ROM, or any other electronic storage known in the art.

The network controller 874, such as an Intel Ethernet PRO network interface card from Intel Corporation of America, can interface between the various parts of the CT scanner. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus for testing scintillators, comprising:
   a light-tight housing configured with a through hole extending from a first side of the light-tight housing to a second side of the light-tight housing;
   a tray configured to hold at least one scintillator;
   a radiation source configured to irradiate a volume corresponding to the through hole of the light-tight housing; and
   an optical detector array arranged inside the light-tight housing and configured to receive light from the at least one scintillator held on the tray in the through hole, wherein
   the tray is arranged in the through hole of the light-tight housing and the tray extends outside the through hole past a plane of the first side of the light-tight housing, and extends past a plane of the second side of the light-tight housing,
   the tray is slidably connected to the light-tight housing, and the tray and the light-tight housing are configured to prevent light from leaking into the light-tight housing, when the tray is in a first testing position.

2. The testing apparatus according to claim 1, further comprising:
   a transmission medium interposed between the at least one scintillator held on the tray and the optical detector array when the tray is in a first testing position, wherein the transmission medium includes air and does not include any liquid, gel, oil, or grease optical coupling agents.

3. The testing apparatus according to claim 1, further comprising:
   a first light seal arranged around an opening of the through hole on the first side of the light-tight housing and a second light seal arranged around an opening of the through hole on the second side of the light-tight housing, wherein
   the first and second light seals are configured to block light from leaking into the light-tight housing when the tray is in the first testing position.

4. The testing apparatus according to claim 1, further comprising:
   a switch configured to signal that electrical power be supplied to the optical detector array when the tray is in the first testing position.

5. The testing apparatus according to claim 1, further comprising:
   a switch configured to signal that electrical power can safely be supplied to the detector array when the tray is in either the first testing position or in a second testing position, wherein the tray is further configured with a first section and a second section, each configured to hold at least one scintillator;

the tray and the light-tight housing are configured to prevent light from leaking the light-tight housing, when the tray is in the second testing position.

6. The testing apparatus according to claim 1, wherein the at least one scintillator is at least one array of scintillator elements, and the tray is configured to accommodate arrays of scintillator elements that have height of greater than nine millimeters and less than thirty-one millimeters.

7. The testing apparatus according to claim 1, wherein the light-tight housing is configured to attenuate radiation emitted by the radiation source such that, at a distance of thirty centimeters from an outside surface of the light-tight housing, a dose rate from the radiation source is less than two mRem/hr.

8. The testing apparatus according to claim 1, wherein the optical detector array includes photomultiplier tubes (PMTs) arranged in a two-dimensional array.

9. The testing apparatus according to claim 1, wherein the radiation source includes pieces of a radioactive element arranged to provide flux density of gamma rays to a plane of the at least one scintillator held in the tray, and the flux density satisfies predefined uniformity criteria.

10. The testing apparatus according to claim 9, wherein the pieces of the radioactive element are pieces of cesium isotope 137.

11. The testing apparatus according to claim 9, wherein the predefined uniformity criteria include that a number of pieces of the radioactive element is less than a predefined number, and that a variation measure of a mean-subtracted flux density in a plane of the tray is less than a predefined threshold, wherein the variation measure includes calculating one of a zero-norm, a one-norm, a two-norm, and an infinity-norm.

12. The testing apparatus according to claim 1, wherein the radiation source provides a flux of gamma rays each having an energy of greater than 511 keV, and the radiation source is a low-activity source that has an activity level of less than 0.55 mCi.

13. The testing apparatus according to claim 1, further comprising:

processing circuitry configured to obtain scintillation data representing light detected by the optical detector array;

generate a flood-map histogram from the scintillation data using Anger logic;

partition the flood-map histogram into regions corresponding to respective elements of the scintillator array;

signal when a first analysis result exceeds a first threshold, wherein the first analysis result represents an integration of the flood-map histogram along boundaries between partitioned regions; and signal when a second analysis result is less than a predefined integer, wherein the second analysis result represents the number of partitioned regions of the flood-map histogram.

14. The testing apparatus according to claim 1, wherein the radiation source is arranged inside the light-tight housing at a position below the through hole, and the optical detector array is arranged at a position above the through hole of the light-tight box.

15. The testing apparatus according to claim 1, further comprising:

processing circuitry configured to obtain scintillation data representing light detected by the optical detector array;

generate a flood-map histogram from the scintillation data using Anger logic;

partition the flood-map histogram into regions corresponding to respective elements of the scintillator array;

signal when any of a first plurality of analysis results fails to exceed a first threshold, wherein the first plurality of analysis results represent peak-to-valley ratios of the respective partitioned region of the flood-map histogram;

signal when any of a second plurality of analysis results exceeds a second threshold, wherein the second plurality of analysis results represent energy resolutions of the respective partitioned region of the flood-map histogram; and signal when any of a third plurality of numbers fails to exceed a third threshold, wherein the third plurality of numbers represent relative light yields of the respective partitioned region of the flood-map histogram.

16. A method of testing scintillator arrays, comprising:

arranging a scintillator array on a tray of an array testing apparatus (ATA);

moving the tray into a first testing position of the ATA;

obtaining, using the ATA, scintillation data representing light detected by the optical detector array; and generating, using circuitry, a flood map from the scintillation data using Anger logic, wherein the ATA includes a light-tight housing having a through hole, the tray configured to hold scintillator arrays, wherein the tray is arranged in the through hole of the light-tight housing and is slidably connected to the light-tight housing, a radiation source configured to irradiate the tray arranged in the through hole of the light-tight housing, an optical detector array arranged inside the light-tight housing and configured to receive light from the scintillator arrays held on the tray, and a switch configured to turn on electrical power to the optical detector array when the scintillator array is in the first testing position, wherein in the first testing position, the scintillator arrays are arranged within a radiation path from the radiation source and the scintillator arrays are arranged in line-of-sight of the optical detector array.

17. The method according to claim 16, further comprising:

partitioning the flood map into regions corresponding to respective elements of the scintillator array;

signaling when a first analysis result exceeds a first threshold, wherein the first analysis result represents an integration of the flood-map histogram along boundaries between partitioned regions; and signaling when a second analysis result is less than a predefined integer, wherein the second analysis result represents the number of partitioned regions of the flood-map histogram.

18. The method according to claim 16, further comprising:
- partitioning the flood map into regions corresponding to respective elements of the scintillator array;
- signal when any of a first plurality of analysis results fails to exceed a first threshold, wherein the first plurality of analysis results represent peak-to-valley ratios of the respective partitioned region of the flood-map histogram;
- signal when any of a second plurality of analysis results exceeds a second threshold, wherein the second plurality of analysis results represent energy resolutions of the respective partitioned region of the flood-map histogram; and
- signal when any of a third plurality of analysis results fails to exceed a third threshold, wherein the third plurality of analysis results represent relative light outputs of the respective partitioned region of the flood-map histogram.

19. The method according to claim 16, wherein
the ATA is further configured to alternatively move the tray into the first testing position and into a second testing position, and
the tray is further includes a first portion to hold scintillator arrays and a portion to hold scintillator arrays, wherein
the first portion of the tray is accessible to a user outside the ATA and the second portion of the tray is arranged inside the light-tight box within a radiation path from the radiation source and within line-of-sight of the optical detector array, when the ATA is in the first testing position, and
the second portion of the tray is accessible to a user outside the ATA and the first portion of the tray is arranged inside the light-tight box within a radiation path from the radiation source and within line-of-sight of the optical detector array, when the ATA is in the second testing position.

* * * * *